Feb. 9, 1971  F. J. McCLUNG ET AL  3,561,839

HIGH-SPEED HOLOGRAM

Original Filed June 15, 1965

INVENTORS.
FREDERICK J. McCLUNG,
ALEXANDER D. JACOBSON,
BY
Robert Thompson
ATTORNEY.

United States Patent Office 3,561,839
Patented Feb. 9, 1971

3,561,839
HIGH-SPEED HOLOGRAM
Frederick J. McClung, Canoga Park, and Alexander D. Jacobson, Sherman Oaks, Calif., assignors to Hughes Aircraft Company, Culver City, Calif., a corporation of Delaware
Continuation of application Ser. No. 464,031, June 15, 1965. This application Oct. 6, 1969, Ser. No. 866,094
Int. Cl. G02b 27/00; H01s 3/00
U.S. Cl. 350—3.5                                    4 Claims

ABSTRACT OF THE DISCLOSURE

A holographic system including a giant pulse ruby laser operated with transverse mode selection and longitudinal mode selection for producing pulsed spatially coherent and temporally coherent radiation, a portion of which illuminates a subject and is reflected to a photographic film as a subject beam, and another portion of which is reflected from a flat mirror and is directed towards the photographic film as a reference beam.

---

This is a continuation of application Ser. No. 464,031, filed June 15, 1965, now abandoned.

This invention relates generally to holography and relates more particularly to an improved means and method for making two beam holograms during ultra-short exposure operations.

In holography, which is the art of taking photographs without lenses, experiments have been conducted using gas lasers to illuminate a subject or object wherein a portion of the laser energy or coherent light impinging upon or illuminating the subject and a portion used as a reference beam are recorded on a photographic film or plate as an interference fringe pattern. In effect, a Fresnel diffraction pattern resulting from the coherent light which impinges upon the illuminated subject and a coherent light reference beam both generated by the same laser source fell upon and were recorded on a high resolution photographic film.

After developing the film, the recorded image could be reconstructed by illuminating the film with coherent light to focus the recorded information in regions of space as a real image and a virtual image of the photographed subject.

To ensure that the hologram is of a high quality, it is necessary that the recorded interference fringes be well defined; and, thus, the laser source must have a high degree of spatial and temporal coherence. In addition, even if the laser source has a high degree of spatial and temporal coherence, the illuminated subject must remain stationary to a fraction of the wavelength of the illuminating light during the exposure duration. This is especially true where the photographed subject is a solid and the recorded laser energy is reflected energy. In this regard, the usual gas laser hologram requires long exposure time—from several seconds to 15 minutes—to adequately expose the high resolution photographic film. As a result of this long exposure time, elaborate precautions were required to avoid mechanical instabilities and movements that could deteriorate the quality of the recorded fringe pattern. In other words, it is necessary for the subject and the film to remain stationary during the entire exposure time.

It was suggested by E. M. Leith and Juris Upatnieks in the Journal of the Optical Society of America, vol. 54, No. 11, November 1964, pp. 1295–1301, that a pulsed laser be used in order to reduce the exposure time. Heretofore, this has not been practical because either the coherence properties of plused laser radiation were not adequate, or else the pulsed source did not have sufficient energy to expose the relatively insensitive high resolution emulsions that were required for use in holography.

Accordingly, an object of this invention is to provide an improved method and means for making holograms during very short exposure durations.

A more specific object is to provide an improved means and method for making holograms in which a subject is illuminated with a mode controlled, giant pulse laser.

Another object is to provide an improved means for and method of longitudinal and transverse mode controlling a giant pulse laser.

The above and other objectives of this invention were achieved with the discovery that a giant pulse ruby laser can be operated with mode selection and still have sufficient energy in a single pulse to record a hologram on a recording medium of relatively low sensitivity high resolution photographic emulsion. During the short pulse duration ($3 \times 10^{-8}$ sec.) longitudinal mode selection is used to reduce the number of frequencies and the spread of the selected frequency as much as possible so that ultimately only a single longitudinal mode of the laser cavity is operating. With the total output held essentially constant, a high spectral brightness is achieved. With longitudinal mode selection, the Fabry-Perot pattern of the pulsed ruby laser output is as clean as that from a single-mode visible gas laser. As a result, sufficient temporal coherence is achieved to record the interference fringes associated with the two-beam hologram process with high fringe visibility.

Other objects, features and advantages will become apparent upon reading the following detailed description of several embodiments and referring to the accompanying drawings in which.

Figure 1:
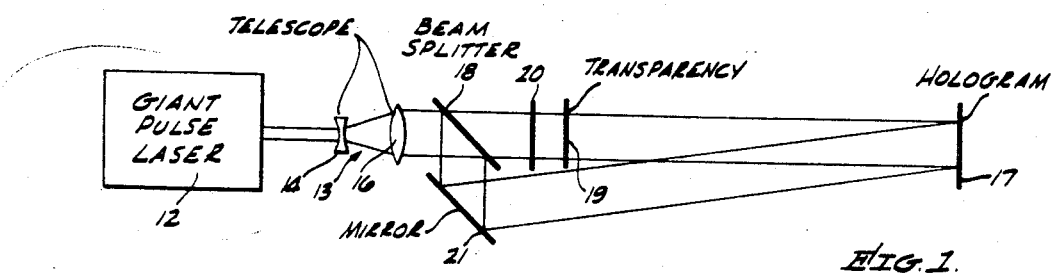
FIG. 1 is a schematic diagram of an arrangement for making a two-beam hologram of a transparent subject with a pulsed laser at high exposure speeds.

Referring now to the drawings, FIG. 1 is a diagram of an arrangement in which a hologram can be made with a transparency as a subject. In operation, a giant pulse laser 12 with mode selection generates a highly coherent (both spatial and temporal) pulsed laser beam. To increase the diameter of the laser beam from a small initial diameter, the beam is projected through a simple telescope 13 which includes a negative lens 14 and a positive lens 16. The reason for using the negative lens 14 is that the beam cannot be focused to a point and passed through a pinhole aperture before recollimation, since peak power is so high that breakdown of the air and damage to the pinhole would result. The positive lens 16 recollimates the beam at a larger diameter and directs it along an optical axis to a recording medium such as a photographic plate 17.

Interposed between the telescope 13 and the photographic plate 17 are a beam splitter 18 and a subject 19 to be illuminated and recorded as a hologram. In the particular embodiment illustrated, the subject 19 is a conventional photographic transparency.

The beam splitter 18 is an optically flat glass having a thin reflection enhancing coating, approximately $\lambda/4$ (quarter-wave) thick, of dielectric material such as zinc sulfide. Approximately 30% of the laser energy is deflected by reflection from the surface of beam splitter 18 to a first surface mirror 21 which, in turn, reflects the diverted portion of the laser beam to the photographic plate 17. This diverted beam is called a reference beam because of its function.

That portion of the laser beam which is transmitted through the beam splitter 18 illuminates the transparency 19. The portion of the laser beam which passes through the transparency 19 also falls upon the photographic plate 17 and is called a subject beam. In addition, a diffuser 20 can be positioned between the beam splitter 18 and the transparency 19 to obtain an extended source of illumination for the subject.

As a result of the reference beam and the subject beam falling on the photographic plate simultaneously, an interference fringe pattern is recorded thereon to produce a hologram. The particular photographic plate 17 used can be of many different high resolution emulsions. For example, 649–F Spectroscopic Plate, V–F Spectroscopic Plate, and High Contrast Copy (microfilm), all made by the Eastman Kodak Co., can be used. In each instance that these emulsions were used, successful holograms were recorded. However, it should be understood that any other high resolution emulsion and other recording mediums could also be used.

Figure 2:
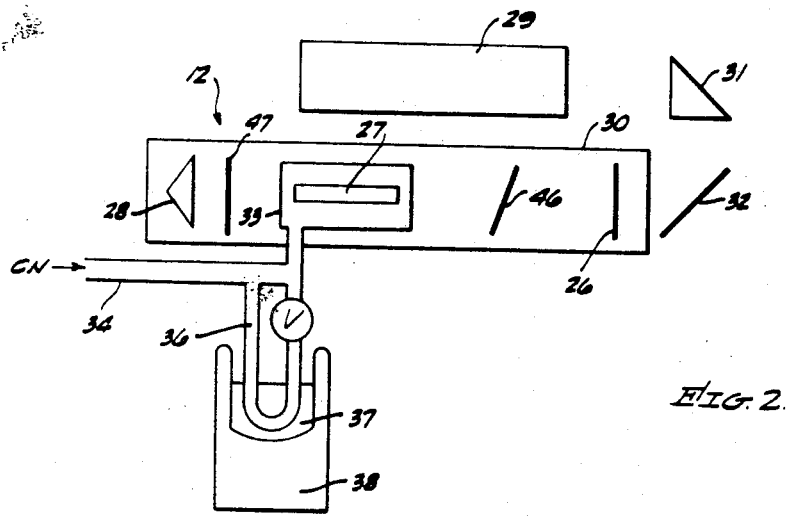
FIG. 2 is a schematic of the giant pulse laser of FIG. 1.

To obtain longitudinal mode selection in a giant pulse laser (GPL) a circuit schematically illustrated in FIG. 2 is used. Without longitudinal mode selection, a typical giant pulse laser has a bandwidth of about 1 cm.$^{-1}$ (30 gc.) which corresponds to about 150 modes for a 50 cm. laser cavity. By replacing a front reflector of the giant pulse laser with a suitable optical flat, the mode structure of the laser may be modified so as to greatly reduce the number of oscillating modes.

A reflection mode selector 26 illustrated in FIG. 2 is an approximately 2 mm. thick interferometrically flat and parallel surface sapphire plate in which the index of refraction $n=1.75$. The space between modes for this flat is therefore 1.4 cm.$^{-1}$. Hence, if one reflection maximum is centered on the peak of the $R_1$ line in ruby, the gain at the adjacent reflection maxima should not be sufficient to produce oscillation. In this way, the number of possible cavity modes is reduced to about 20 from about 150.

Structurally, the reflection mode selector 26 is aligned parallel to an uncoated ruby 27 and rotating prism Q switch 28 with the aid of a gas laser alignment light source 29 whose beam enters the laser cavity 30 via a prism 31 and a beam splitter 32.

The center of the $R_1$ line in ruby is tuned to one of the reflection maxima of the reflection mode selector 26 by cooling the ruby 27. In one apparatus that was constructed, the ruby was cooled to about 0° C. This cooling is advantageous in other ways: it produces a decrease in the width of the $R_1$ line which further reduces the number of possible modes; and it also increases the peak gain of the $R_1$ line. This is useful because the peak reflectivity of the reflection mode selector 26, which has a refractive index that is as high as is readily available, is only about 25%, without the added reflectivity of the ruby.

The cooling is accomplished by passing cold dry nitrogen gas CN into a flash lamp housing 33 and past the ruby 27. To control the temperature of the nitrogen gas reaching the ruby, part of the dry nitrogen gas CN coming in through passageway 34 is diverted through a heat exchanger coil 36 that is in thermal contact with a liquid nitrogen bath 37 in a dewar 38. As previously mentioned, the reason for temperature tuning the ruby 27 is so that its fluorescence peak coincides with a reflection maximum of the reflection mode selector 26.

To reduce the number of oscillating modes still further, other sets of interferometrically flat surfaces may be introduced within the laser cavity 30. These surfaces have transmission maxima and minima whose frequency spacing is determined by the distance between surfaces and by the refractive index of the intervening material.

The ruby crystal 27 provides one such set of interferometrically flat surfaces. In one embodiment that was constructed, the ruby was 3 inches long, ⅜ inch in diameter, and had transmission maxima every 1.2 gc. As a result, two or three out of every four consecutive cavity modes that are separated by 300 mc. are suppressed.

What remains is to suppress all but one of the approximately five modes of the ruby, which are separated by 1.2 gc. This is done in principle by placing the ruby 27 at such a distance from the front reflecting surface 26 so as to form a suitable cavity. To suppress all but one of the 1.2 gc. modes, an optically flat and parallel glass plate 46 is inserted across and tilted slightly with respect to the laser beam forming a transmission mode selector. The operation of this mode selector can be understood by considering that this tilted plate has no reflection loss for frequencies corresponding to its Fabry-Perot transmission maxima. At other frequencies the reflections from this transmission mode selector 46 are lost from the cavity and thus constitute a frequency-dependent loss mechanism at a given angle. The fact that the plate 46 is tilted means that there are no other resonators formed with other reflectors within the cavity 30. The frequency is turned by varying tilt angle of the flat.

This tilted flat glass plate 46 or transmission mode selector is made of a 1 cm. thick interferometrically flat piece of flint glass whose modes are separated by about 10 gc. The correct angle or tilt is determined empirically, i.e. by seeing which of several angles gives the least number of ruby laser modes, and the least interaction with the reflection mode selector. In addition, the use of this transmission mode selector has the advantage of suppressing weak side modes of the reflection mode selector which otherwise could appear at high pumping level.

At the high power levels desired (about 10 mw.) the foregoing technique can be supplemented with a dye mode selector 47 to produce reliable single mode behavior. The dye mode selector 47 includes a cell containing a cryptocyanine dye solution and has proved useful in mode control. Structurally, the dye mode selector was formed by an approximately $5 \times 10^{-6}$ molar solution of cryptocyanine in methanol placed in a cell with interferometrically flat windows 2 mm. apart. The absorption at 6,943 A. is about 25% and the cell is wedged and tilted slightly with respect to the laser beam to reduce transmission mode selection effects.

Transverse mode control in the giant pulse laser is achieved with an aperturing technique. The principle upon which this technique is based arises from the fact that the transverse dimensions of a mode increase with increasing mode number for a given cavity geometry. This fact was observed by Evtuhov and Neeland, Applied Optics Journal, vol. 1, p. 517, 1962, in an article entitled Observations Relating to the Transverse and Longitudinal Modes of a Ruby Laser. For a particular mode the transverse dimensions are governed by parameters such as cavity length, effective curvature of the reflectors and the focal length and position of any lenses introduced into the cavity. The highest order mode that can be supported within the cavity is determined by some aperture in the cavity which may be that of the ruby itself or the physical dimension of the reflectors or possibly the aperture associated with lenses introduced into the cavity. In an ideal cavity having a ruby crystal with flat windows and flat reflectors the transverse mode structure can be limited to the lowest order mode by a single aperture 48 of suitable size placed anywhere within the cavity. In any practical laser, the optical quality of the ruby and the presence of the apex edge of the roof prism commonly used for Q-switching require that both the size and the position of the aperture be chosen more carefully. Using this technique, it is possible to achieve single transverse mode operation.

The output of the mode controlled giant pulse laser (about 60 mj.) is, of course, less than that of an uncontrolled giant pulse laser; but, nevertheless, a single output pulse has sufficient energy to expose all of the relatively low-sensitivity emulsions tried for the film 17. Of course, it should be understood that other means of mode control could be used.

Figure 3:
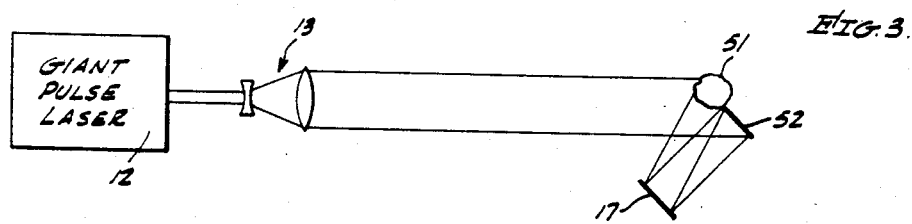
FIG. 3 is an arrangement for making holograms of solid three-dimensional subjects at high exposure speeds.
Figure 4:
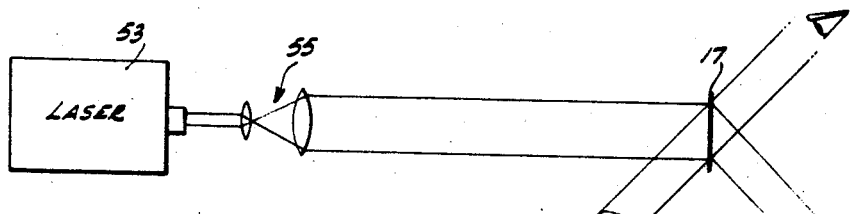
FIG. 4 is an arrangement for reconstructing and projecting the information recorded on the hologram.

Holograms can also be made of solid, three-dimensional subjects by using an arrangement illustrated in FIG. 3. In operation, the laser beam from the giant pulse laser 12 is transmitted through the telescope 13 to spread the laser beam. A solid three-dimensional subject 51 is positioned in the laser beam so that the coherent light is reflected from the subject onto the high resolution photographic plate 17. In addition, a high quality first surface mirror 52 is located adjacent to the three-dimensional subject and is positioned to reflect a portion of the coherent light from the laser onto the photographic plate 17. This radiation reflected from the mirror 52 forms the reference beam. The reference beam and the subject beam are recorded on the photographic plate 17 as an interference fringe pattern to produce a hologram. From this recorded fringe pattern there can be reconstructed a three-dimensional image of the subject, after the high resolution film 17 is developed.

Reconstruction of the image from the hologram is achieved by directing a beam of coherent light from a continuous wave laser 53 through a collimating system 55 and through the hologram 17. As a result a virtual image 54 of the subject is reconstructed in the region behind the plane of the photographic plate 17 where an observer looks through the hologram 17 toward the laser from a proper range of angles. A real image 56 is reconstructed in the region in front of the plate when an observer looks toward the hologram 17 from another range of angles.

These reconstructed images exhibit certain observable characteristics, such as: parallax between near and far elements of the image, which is exactly that parallax which occurs when viewing the original subject; the perspective of the reconstructed image changes as the observer's eye is repositioned in space to look through the hologram 17 at various angles; and an observer must refocus his eyes when shifting his observation from a near portion of the image to a more distant portion.

While the salient features of the invention have been shown and described with respect to particular embodiments, it will be readily apparent that numerous modifications may be made within the spirit and scope of the invention and it is, therefore, not desired to limit the invention to the exact details shown except insofar as they may be defined in the following claims.

What is claimed is:

1. In a method for obtaining holograms of subject by irradiating the subject with a portion of a beam of laser energy, receiving laser energy from the irridated subject at a recording medium, directing a portion of the laser energy which does not irradiate the subject to irradiate the recording medium, and recording the resultant fringe pattern, which is created at the recording medium, wherein the improvement comprises the steps of:
   providing a laser pulse having sufficiently high energy in at least one single longitudinal mode and single transverse mode output pulse to expose the recording medium; and
   mode selecting the laser pulse to select a single transverse mode and a single longitudinal mode of the laser output pulse of sufficient energy to expose the recording medium.

2. In a device for obtaining a hologram of a subject by means of laser energy including means for directing a portion of the laser energy to irradiate the subject, a recording means having a high resolution recording medium positioned to receive laser energy from the irradiated subject, and means for directing a portion of the laser energy, which does not irridate the subject, to the recording means for creating an interference fringe pattern at the recording medium whereat the interference fringe pattern at the recording medium can be recorded wherein the improvement comprises:
   a giant pulse laser means for generating pulsed spatially coherent and temporally coherent laser energy; and
   longitudinal and transverse mode selector means coupled to select a single transverse and longitudinal mode of the laser cavity for an output pulse of laser energy with sufficient energy to expose the recording medium.

3. In a device for obtaining a hologram of a subject by means of laser energy including means for directing a portion of the energy to irradiate the subject, a recording means having a high resolution recording medium positioned to receive laser energy reflected from the irradiated subject, and means for directing a portion of laser energy, which does not illuminate the subject, to the recording means for creating an interference fringe pattern at the recording medium whereat the interference fringe pattern can be recorded wherein the improvement comprises:
   a laser means having a Q-switch for generating a high energy pulse of spatially coherent and temporally coherent laser energy; and
   transverse mode selector means and longitudinal mode selector means coupled to select a single transverse and longitudinal mode of the laser cavity for an output pulse of laser energy of sufficient energy to expose the high resolution recording medium.

4. In a device for obtaining a hologram of a subject by means of laser energy including means for directing a portion of the laser energy to illuminate the subject, a recording means having a high resolution photographic emulsion positioned to receive laser energy reflected from the illuminated subject, and means for directing a portion of laser energy, which does not illuminate the subject, to the recording means for creating an interference fringe pattern at the photographic emulsion whereat the interference fringe pattern can be recorded at the emulsion wherein the improvement comprises:
   a laser means having a Q-switch for generating a pulse of spatially coherent and temporally coherent laser energy; and
   a mode selector coupled to select a single transverse mode and a single longitudinal mode of the laser cavity for an output pulse of laser energy of sufficient energy to expose the photographic emulsion

References Cited

UNITED STATES PATENTS

| 3,315,177 | 4/1967 | Benson | 331—94.5 |
| 3,354,404 | 11/1967 | Boyle et al. | 331—94.5 |
| 3,358,243 | 12/1967 | Collins et al. | 331—94.5 |

OTHER REFERENCES

Leith et al.: Jour. of the Optical Society of America, vol. 54, No. 11, pp. 1295–1301, November 1964.

McClung et al.: IEEE Jour. of Quantum Electronics, vol. QE–1, No. 2, May 1965, pp. 94–99.

Dulberger et al.: Electronics, vol. 36, No. 52, Dec. 27, 1963, p. 44.

Silverman et al.: Jour. of Applied Meteorology, vol. 3, December 1964, pp. 792–801.

DAVID SCHONBERG, Primary Examiner

R. J. STERN, Assistant Examiner

U.S. Cl. X.R.

331—94.5